United States Patent
Makino et al.

(10) Patent No.: US 11,245,800 B2
(45) Date of Patent: Feb. 8, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventors: Yohei Makino, Kanagawa (JP); Hiroyuki Mitsuhashi, Kanagawa (JP); Yusuke Taguchi, Kanagawa (JP); Akihiro Ishii, Kanagawa (JP); Shuhei Toda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/023,497

(22) Filed: Sep. 17, 2020

(65) Prior Publication Data
US 2021/0234974 A1 Jul. 29, 2021

(30) Foreign Application Priority Data
Jan. 24, 2020 (JP) .............................. JP2020-009957

(51) Int. Cl.
*H04N 1/00* (2006.01)

(52) U.S. Cl.
CPC ..... *H04N 1/00323* (2013.01); *H04N 1/00408* (2013.01); *H04N 1/00514* (2013.01); *H04N 2201/0094* (2013.01)

(58) Field of Classification Search
None
See application file for complete search history.

(56) References Cited

U.S. PATENT DOCUMENTS

2017/0371600 A1* 12/2017 Tanaka ............... H04N 1/00381
2018/0018950 A1* 1/2018 Tsuda ...................... G06F 3/165
2019/0115107 A1* 4/2019 Hong .................. A61B 5/0022

FOREIGN PATENT DOCUMENTS

JP 2017-94679 A 6/2017
JP 6256534 B2 1/2018

* cited by examiner

*Primary Examiner* — Frantz Bataille
(74) *Attorney, Agent, or Firm* — Oliff PLC (57) ABSTRACT

An information processing apparatus includes a processor. The processor is configured to acquire biological information on a user, and output information that supports a process when a psychological state of the user indicated by the biological information is brought to a state determined in advance while an operation related to the process is performed by the user.

20 Claims, 7 Drawing Sheets

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-009957 filed Jan. 24, 2020.

BACKGROUND

(i) Technical Field

The present disclosure relates to an information processing apparatus and a non-transitory computer readable medium.

(ii) Related Art

There is a technique of proposing an appropriate countermeasure in the case where there occurs a state that is inconvenient to a user during use of an image processing apparatus. Japanese Patent No. 6256534, for example, describes analyzing a stress on a user related to the use of an image processing apparatus and optimizing the environment of use of an image forming system on the basis of the analysis result. Japanese Unexamined Patent Application Publication No. 2017-94679 describes displaying an operation screen for stopping a job in the case where a user of an image forming apparatus is in a tensed state.

SUMMARY

In the case where the user is to perform an operation related to a process, the user occasionally does not how to perform the operation. In this case, in order to advance the process, information that supports an operation that advances the process is preferably output. If information that supports an operation is output at a timing when the user does not desire support for the operation, however, such information may be annoying.

Aspects of non-limiting embodiments of the present disclosure relate to improving the convenience for a user compared to the case where the user is supported for a process for which he/she is performing an operation irrespective of the psychological state of the user during a period when the user is performing an operation related to the process.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor, in which the processor is configured to acquire biological information on a user, and output information that supports a process when a psychological state of the user indicated by the biological information is brought to a state determined in advance while an operation related to the process is performed by the user.

BRIEF DESCRIPTION OF THE DRAWINGS

An exemplary embodiment of the present disclosure will be described in detail based on the following figures, wherein.

DETAILED DESCRIPTION

1. Configuration

Figure 1:
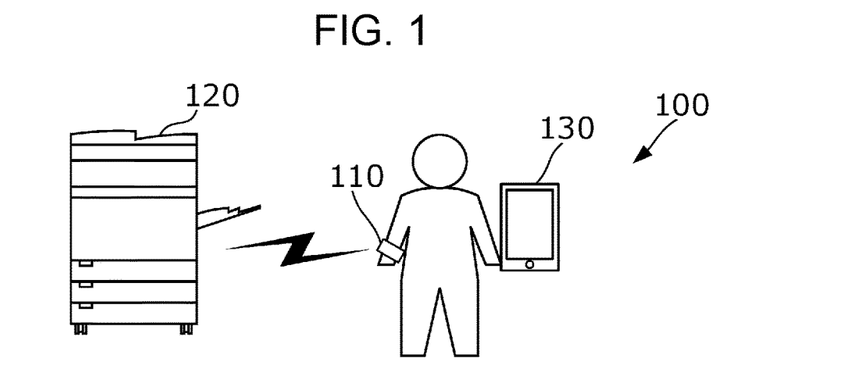
FIG. 1 illustrates an example of the configuration of an image processing system 100 according to an exemplary embodiment.

FIG. 1 illustrates an example of the configuration of an image processing system 100 according to the present exemplary embodiment. The image processing system 100 includes a wearable terminal 110, an image processing apparatus 120, and a user terminal 130.

The wearable terminal 110 is mounted to a user, and measures biological information on the user. The biological information is information that indicates a psychological state of the user. The psychological state is a state in which the user feels stressed, for example. The biological information may include a heart rate or a blood pressure, for example. The wearable terminal 110 may have the shape of a wristband mounted to an arm as illustrated in FIG. 1. However, the shape of the wearable terminal 110 is not limited to a wristband shape. For example, the shape of the wearable terminal 110 may be any shape such as the shape of a ring mounted to a finger, the shape of a clip attached to a garment, the shape of glasses mounted to the head, and a head-mount type. The wearable terminal 110 includes one or a plurality of sensors (not illustrated) that measure biological information. In the case where the biological information includes a heart rate, for example, the wearable terminal 110 includes a heart rate meter that measures the heart rate. In the case where the biological information includes a blood pressure, the wearable terminal 110 includes a sphygmomanometer that measures the blood pressure. The wearable terminal 110 also includes a communication section (not illustrated). The communication section performs data communication with a different device in accordance with Bluetooth (registered trademark), for example. However, the communication standard which is employed by the communication section is not limited to Bluetooth (registered trademark), and may be a different communication standard. The wearable terminal 110 transmits the biological information from the communication section to the image processing apparatus 120, for example.

Figure 2:
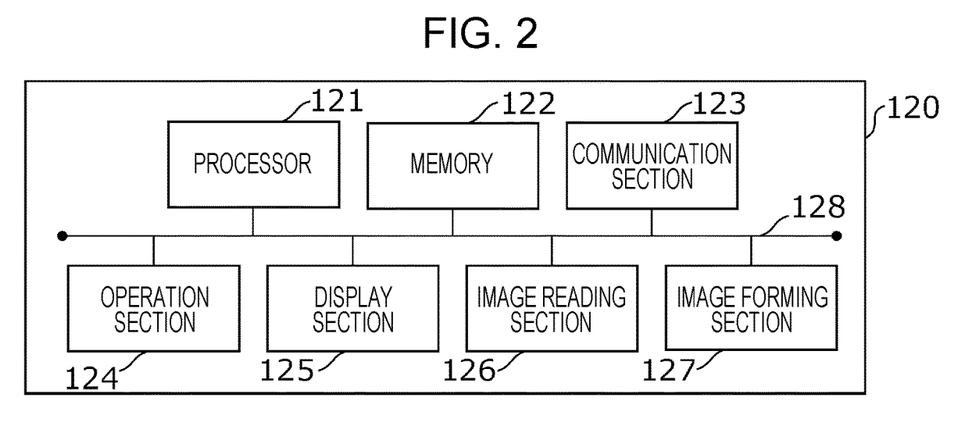
FIG. 2 illustrates an example of the configuration of an image processing apparatus 120.

FIG. 2 illustrates an example of the configuration of the image processing apparatus 120. The image processing apparatus 120 has a plurality of functions to process an image, such as a copy function, a print function, a scan function, and a facsimile function. The image processing apparatus 120 includes a processor 121, a memory 122, a communication section 123, an operation section 124, a display section 125, an image reading section 126, and an image forming section 127. Such sections are connected to each other via a bus 128.

The processor 121 controls the various sections of the image processing apparatus 120 or performs various processes by executing a program. The processor 121 may be a central processing unit (CPU), for example. The memory 122 stores a program to be executed by the processor 121. The memory 122 may be a read only memory (ROM) and a random access memory (RAM), for example. The memory 122 may also be a hard disk drive or a solid state drive (SSD), for example, in addition to the ROM and the RAM. The memory 122 stores a plurality of application programs (hereinafter referred to as "apps") that achieve the plurality of functions of the image processing apparatus 120. Examples of the plurality of apps include a copy app that achieves the copy function, a print app that achieves the print function, a scan app that achieves the scan function, a facsimile app that achieves the facsimile function, and a communication setting app that achieves setting for communication. The communication section 123 performs data communication with a different device connected via a communication line. The communication line may be a wired communication line, or may be a wireless communication line. Examples of the communication standard which is employed by the communication section 123 include Bluetooth (registered trademark). The operation section 124 is used by the user to operate the image processing apparatus 120. Examples of the operation section 124 include a touch screen and keys. The display section 125 displays various types of information. The display section 125 may be a liquid crystal display, for example. The image reading section 126 reads an image, and converts the image into image data. The image reading section 126 may be an image scanner, for example. The image forming section 127 forms an image that matches image data on a medium such as paper. The image forming section 127 may be a printer, for example.

Figure 3:
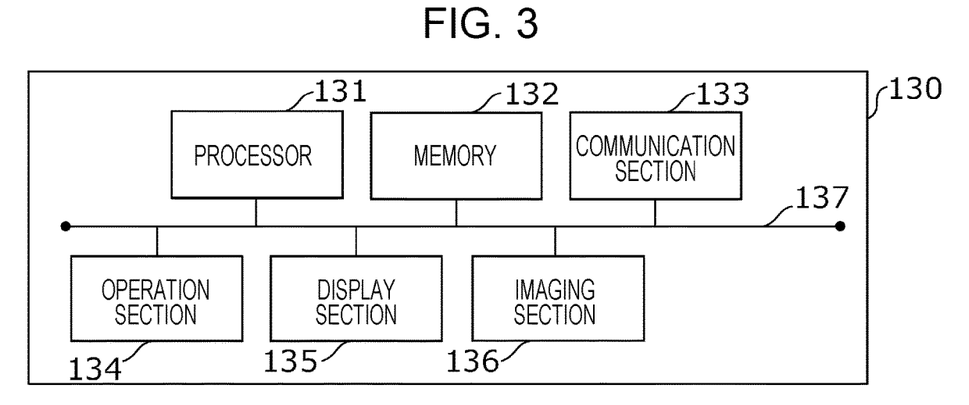
FIG. 3 illustrates an example of the configuration of a user terminal 130.

FIG. 3 illustrates an example of the configuration of the user terminal 130. The user terminal 130 is used by the user. As illustrated in FIG. 1, the user terminal 130 may be a smartphone or a tablet terminal that may be carried by the user. However, the user terminal 130 is not limited to a smartphone or a tablet terminal, and may be any terminal apparatus that is used by the user. The user terminal 130 is an example of the terminal apparatus according to the present disclosure. The user terminal 130 includes a processor 131, a memory 132, a communication section 133, an operation section 134, a display section 135, and an imaging section 136. Such sections are connected to each other via a bus 137.

The processor 131 controls the various sections of the user terminal 130 or performs various processes by executing a program. The processor 131 may be a CPU, for example. The memory 132 stores a program to be executed by the processor 131. The memory 132 may be a ROM and a RAM, for example. The memory 132 may also be a hard disk drive or an SSD, for example, in addition to the ROM and the RAM. The communication section 133 performs data communication with a different device connected via a communication line. The communication line may be a wired communication line, or may be a wireless communication line. The operation section 134 is used by the user to operate the user terminal 130. Examples of the operation section 134 include a touch screen and keys. The display section 135 displays various types of information. The display section 135 may be a liquid crystal display, for example. The imaging section 136 captures an image. The imaging section 136 may be a digital camera, for example. The user terminal 130 has a function of reading a two-dimensional code using the imaging section 136.

2. Operation 2-1. Normal Case

Figure 4:
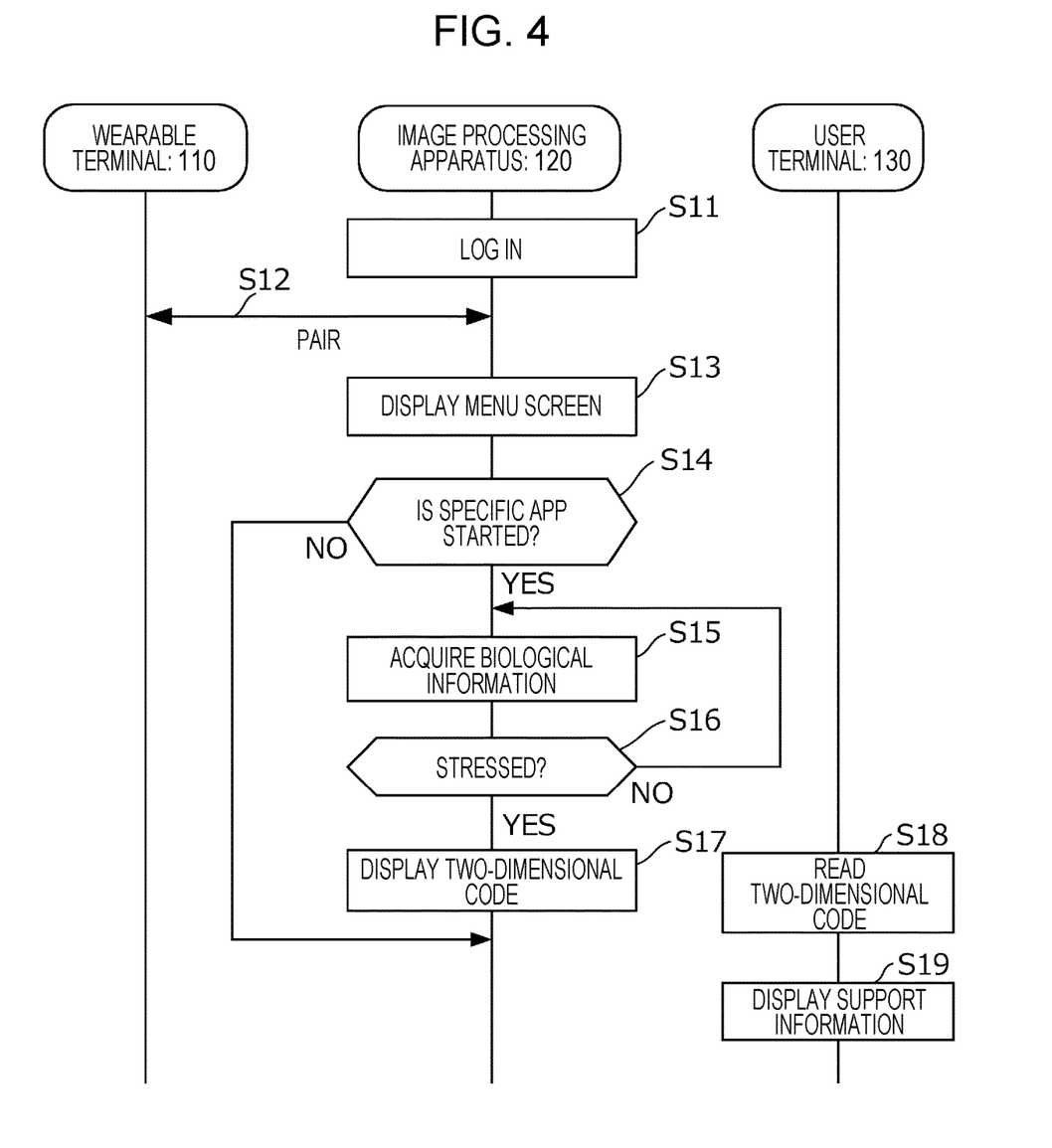
FIG. 4 is a sequence chart illustrating an example of operation performed by the image processing system 100.
Figure 5:
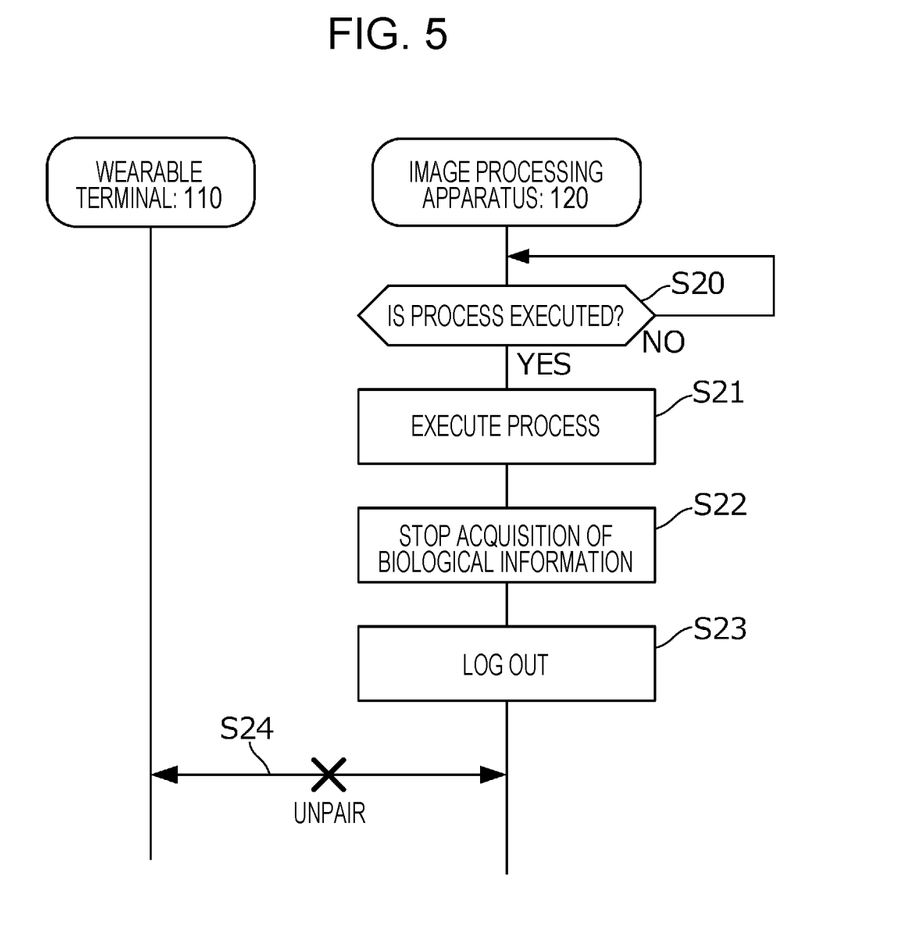
FIG. 5 is a sequence chart illustrating an example of operation performed by the image processing system 100.

FIGS. 4 and 5 are each a sequence chart illustrating an example of operation performed by the image processing system 100. This operation is performed when the user moves to the front of the image processing apparatus 120 to use the image processing apparatus 120. The example illustrated in FIGS. 4 and 5 indicates an operation example for a normal case where an error does not occur while the user is performing an operation related to a process. The operation related to a process includes any operation that is necessary to execute the process. Specific examples include a touch operation, a depressing operation, etc. of an operation button such as a software key displayed as an image and a hardware key. In the case where the processor 121 or 131 is indicated as the subject of a process in the following description, it is meant that the process is performed by the processor 121 or 131 performing computation or controlling operation of other hardware elements through cooperation of the program which is stored in the memory 122 or 132 and the processor 121 or 132 which executes the program.

In step S11, the user logs in to the image processing apparatus 120. The processor 121 of the image processing apparatus 120 authenticates the user who has logged in. For example, the user performs an operation to input his/her user ID and password using the operation section 124. The processor 121 authenticates the user using the user ID and the password which are input by the user. When the user is successfully authenticated, the process proceeds to step S12. In the case where the user is not successfully authenticated, the process is ended.

In step S12, the processor 121 pairs the image processing apparatus 120 with the wearable terminal 110 of the user. For example, the user ID of the user is correlated in advance with a terminal ID of the wearable terminal 110 of the user. A terminal ID correlated with the user ID which is input in step S11 is specified. The image processing apparatus 120 is paired with the wearable terminal 110 corresponding to the terminal ID in accordance with Bluetooth (registered trademark). Consequently, the image processing apparatus 120 and the wearable terminal 110 are wirelessly connected to each other. While the image processing apparatus 120 is paired with one wearable terminal 110, the image processing apparatus 120 is not paired with a different wearable terminal 110.

In step S13, when the user logs in to the image processing apparatus 120, the processor 121 displays a menu screen 140 on the display section 125. The user operates the menu screen 140 using the operation section 124.

Figure 6:
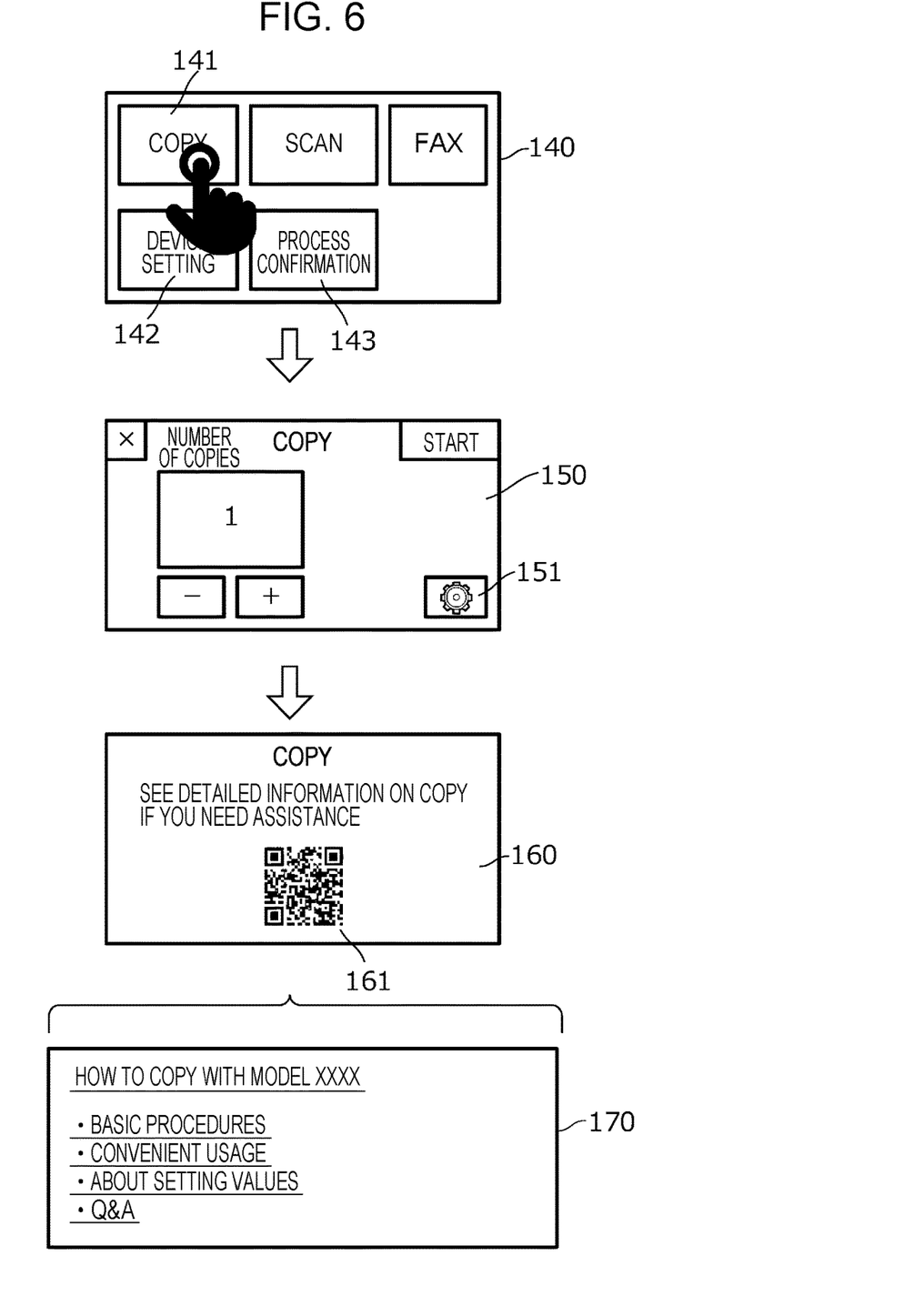
FIG. 6 illustrates an example of various screens displayed on the image processing apparatus 120.

FIG. 6 illustrates an example of various screens displayed on the image processing apparatus 120. The menu screen 140 is used by the user to perform an operation to select a desired function from the plurality of functions of the image processing apparatus 120. The menu screen 140 includes operation buttons that are used to perform an operation to select the various functions of the image processing apparatus 120. To use the copy function, for example, the user performs an operation to press a copy button 141 corresponding to the copy function. The copy app is started in response to this operation.

In step S14, the processor 121 determines whether or not a specific app is started. Apps that are used to achieve the plurality of functions of the image processing apparatus 120 include a specific app and other excluded apps. The specific app is an app that involves operations related to a process that achieves the corresponding function, the operations being so complicated that it is considered to be desirable to provide support for the operations. Examples of the specific app include apps that are used to execute a process such as the copy app and the scan app, and apps that involve a relatively large number of operation procedures such as the communication setting app. On the other hand, the excluded app is an app that involves operations related to a process that achieves the corresponding function, the operations being so simple that it is considered to be unnecessary to provide support for the operations. Examples of the excluded app include apps that involve a relatively small number of operation procedures such as a process confirmation app which achieves a function of confirming the status of progress or the history of a process. The condition for the excluded app is an example of the specific condition according to the present disclosure. The process executed by the excluded app is an example of the first process according to the present disclosure.

When the user performs an operation to press the copy button 141 using the operation section 124 on the menu screen 140 illustrated in FIG. 6, for example, the determination in step S14 is YES, and the process proceeds to step S15. In addition, a copy screen 150 illustrated in FIG. 6 is displayed on the display section 125 in response to this operation. The user performs an operation related to the copy process using the operation section 124 on the copy screen 150.

In step S15, the processor 121 acquires biological information from the wearable terminal 110. Acquisition of biological information is started when the specific app is started, and repeatedly performed at time intervals determined in advance. Specifically, the processor 121 transmits, from the communication section 123, a request to acquire biological information to the wearable terminal 110 which is paired in step S12. The wearable terminal 110 transmits biological information measured from the user to the image processing apparatus 120 in response to this acquisition request. The wearable terminal 110 receives, at the communication section 123, the biological information which is transmitted from the wearable terminal 110.

In step S16, the processor 121 determines whether or not the user is feeling stressed while he/she is performing an operation related to the process, by analyzing the latest biological information that is acquired from the wearable terminal 110. The state of feeling stressed is an example of the psychological state determined in advance according to the present disclosure. In the case where the biological information includes a heart rate or a blood pressure, for example, it is determined that the user is feeling stressed if the heart rate or the blood pressure is equal to or more than a threshold value. The threshold value is set in advance to a heart rate or a blood pressure measured when a person feels a certain degree of stress, for example. In the case where it is determined that the user is not feeling stressed, the determination in step S16 is NO, and the process returns to step S15. In the case where it is determined that the user is feeling stressed, on the other hand, the determination in step S16 is YES, and the process proceeds to step S17.

In step S17, the processor 121 displays, on the display section 125, a support screen that supports an operation performed when the user is feeling stressed. The support screen includes a two-dimensional code that indicates information (hereinafter referred to as "support information") that supports an operation performed when the user is feeling stressed. The two-dimensional code is an image obtained by encoding the support information, that is, an image that is used to display the support information on the user terminal 130. The support information is information that guides an operation related to an app that is operating when the user is feeling stressed, for example. Different support information is used, depending on the screen on which an operation is performed when the user is feeling stressed, for example. Supporting an operation corresponds to supporting a process as the target of the operation.

As illustrated in FIG. 6, for example, in the case where it is determined that the user is feeling stressed while the copy screen 150 is displayed, it is considered that the user is feeling stressed with an operation related to the copy process. Thus, in this case, a two-dimensional code 161 is generated by encoding support information 170 that supports an operation related to the copy process, and displayed. Examples of the support information 170 include basic operation procedures for the copy process, a convenient operation method for the copy process, and a description of setting values for the copy process.

Figure 7:
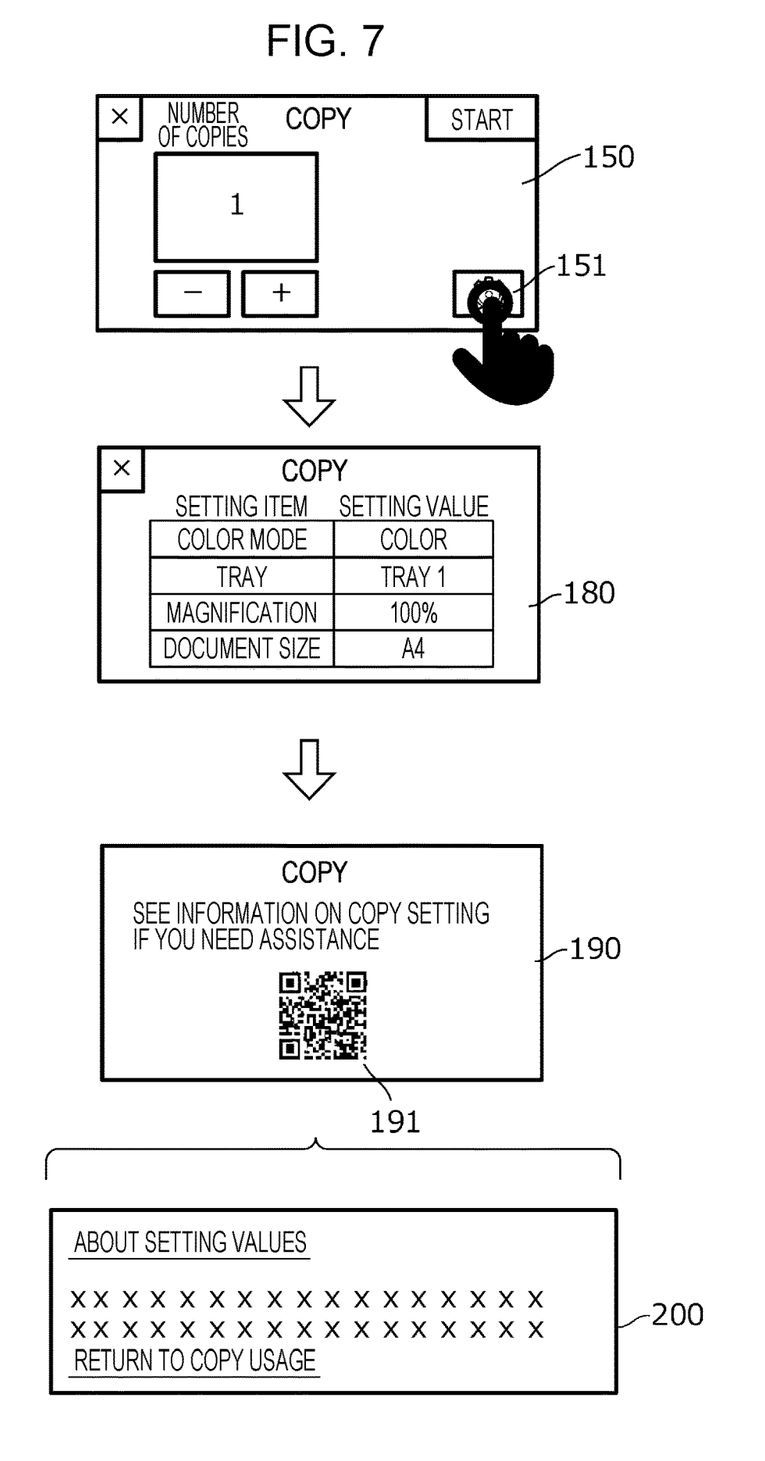
FIG. 7 illustrates another example of support information.

FIG. 7 illustrates another example of support information. As illustrated in FIG. 7, the copy screen 150 includes a setting button 151 that is used to perform an operation to transition to a setting screen 180 for the copy process. When the user performs an operation to press the setting button 151 using the operation section 124, the setting screen 180 is displayed on the display section 125. The setting screen 180 is used to perform an operation to set the setting values for the copy process. In the case where it is determined that the user is feeling stressed while the setting screen 180 is displayed, it is considered that the user is feeling stressed with an operation to set the setting values for the copy process. Thus, in this case, a two-dimensional code 191 is generated by encoding support information 200 that supports an operation to set the setting values for the copy process, and a support screen 190 including the two-dimensional code 191 is displayed on the display section 125. Examples of the support information 200 include detailed information that describes the various setting values for the copy process, for example. As illustrated in FIGS. 6 and 7, different support information is displayed, depending on the operation that the user is performing, or the screen on which the user is performing an operation, at the time when it is determined that the user is feeling stressed.

Figure 8:
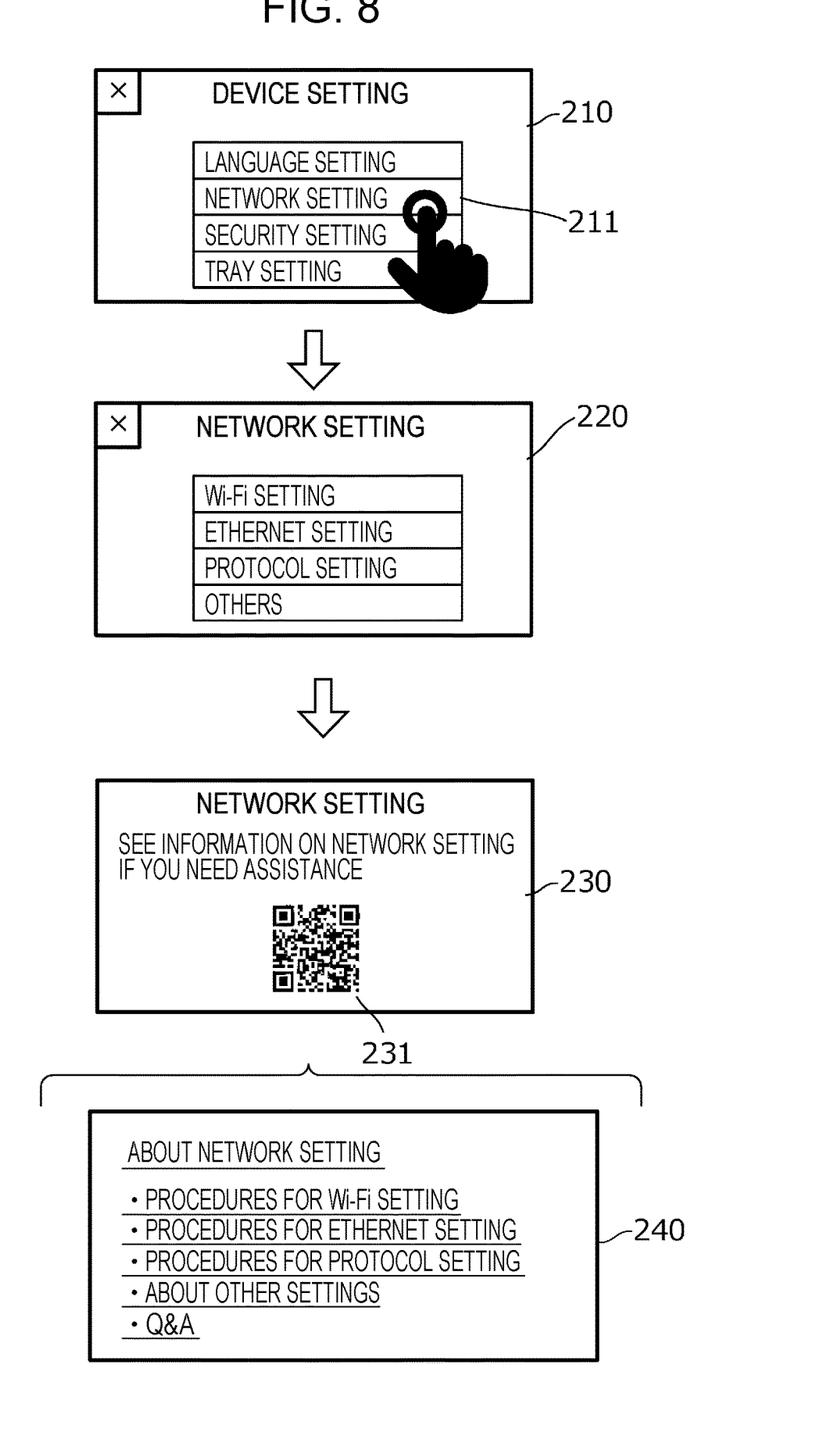
FIG. 8 illustrates still another example of support information.

FIG. 8 illustrates still another example of support information. When the user performs an operation to press a device setting button 142 on the menu screen 140 illustrated in FIG. 6, for example, a device setting screen 210 illustrated in FIG. 8 is displayed on the display section 125. The device setting screen 210 includes a setting button 211 that is used to perform an operation to transition to a communication setting screen 220. When the user performs an operation to press the setting button 211 using the operation section 124, the communication setting app is started, and the communication setting screen 220 is displayed on the display section 125. The communication setting screen 220 is used to perform an operation to perform setting for communication. In the case where it is determined that the user is feeling stressed while the communication setting screen 220 is displayed, for example, it is considered that the user is feeling stressed with an operation to perform setting for communication. Thus, in this case, a two-dimensional code 231 is generated by encoding support information 240 that supports an operation to perform setting for communication, and a support screen 230 including the two-dimensional code 231 is displayed on the display section 125. Examples of the support information 240 include operation procedures for performing setting for communication according to various communication standards and detailed information on other settings related to communication.

In step S18, when the two-dimensional code is displayed on the display section 125, the user reads the two-dimensional code using the user terminal 130. The user captures the two-dimensional code using the imaging section 136, for example. The processor 131 decodes the two-dimensional code which is captured by the imaging section 136, and recovers the support information which is indicated by the two-dimensional code.

In step S19, the processor 131 displays, on the display section 135, the support information which is obtained from the two-dimensional code. In the case where the two-dimensional code 161 illustrated in FIG. 6 is read, for example, the support information 170 which supports an operation related to the copy process is displayed on the display section 135. This allows the user to know how to perform an operation related to the copy process. In the case where the two-dimensional code 191 illustrated in FIG. 7 is read, the support information 200 which supports an operation to set the setting values for the copy process is displayed on the display section 135. This allows the user to know how to perform an operation to set the setting values for the copy process. In the case where the two-dimensional code 231 illustrated in FIG. 8 is read, the support information 240 which supports an operation to perform setting for communication is displayed on the display section 135. This allows the user to know how to perform an operation to perform setting for communication. In this case, the user may continue operating the image processing apparatus 120 while referencing the support information which is displayed on the display section 135 of the user terminal 130. When an operation of the image processing apparatus 120 by the user is resumed in this manner, the process may return to step S15.

When the user performs an operation to press an operation button corresponding to an excluded app on the menu screen 140 illustrated in FIG. 6, for example, in step S14 discussed above, on the other hand, the determination in step S14 is NO, and the processes in steps S15 to S17 discussed above are not performed. If the user performs an operation to press an operation button 143 corresponding to the process confirmation app which achieves a function of confirming the status of progress or the history of a process, for example, a process confirmation screen that indicates the status of progress or the history of a process is displayed on the display section 125. While an operation to confirm the status of progress or the history of a process is performed on the process confirmation screen, biological information is not acquired, and therefore support information is not displayed. In this case, the user continues operating the image processing apparatus 120 without referencing support information.

In step S20 illustrated in FIG. 5, the processor 121 determines whether or not an instruction to execute a process is provided. In the case where an instruction to execute a process is not provided, the determination in step S20 is NO, and the process in step S20 is repeatedly performed. On the other hand, when the user performs an operation to provide an instruction to execute a process using the operation section 124, for example, the determination in step S20 is YES, and the process proceeds to step S21. Also in the case where the user performs an operation to provide an instruction to execute a process while it is determined in step S16 discussed above that the user is not feeling stressed, the determination in step S20 is YES, and the process proceeds to step S21.

In step S21, the processor 121 executes the process in accordance with the operation by the user. When an operation to instruct execution of the copy process is performed after an operation to perform setting for the copy process, for example, the copy process is performed in accordance with the set content using the image reading section 126 and the image forming section 127.

In step S22, the processor 121 ends acquisition of biological information when the app that is operating is stopped. When the user performs an operation to stop the app that is operating using the operation section 124, for example, the app that is operating is stopped, the screen corresponding to the app is closed, and the menu screen 140 illustrated in FIG. 6 is displayed on the display section 125 again. When this operation is performed, acquisition of biological information from the wearable terminal 110 is ended. The process in step S22 is not performed in the case where the specific app is not started in step S14.

In step S23, the user logs out from the image processing apparatus 120. When the user logs out, the processor 121 unpairs the image processing apparatus 120 from the wearable terminal 110 in step S24. The user performs an operation to log out using the operation section 124, for example. When this operation is performed, the image processing apparatus 120 is unpaired from the wearable terminal 110.

2-2. Case where Error has Occurred

Figure 9:
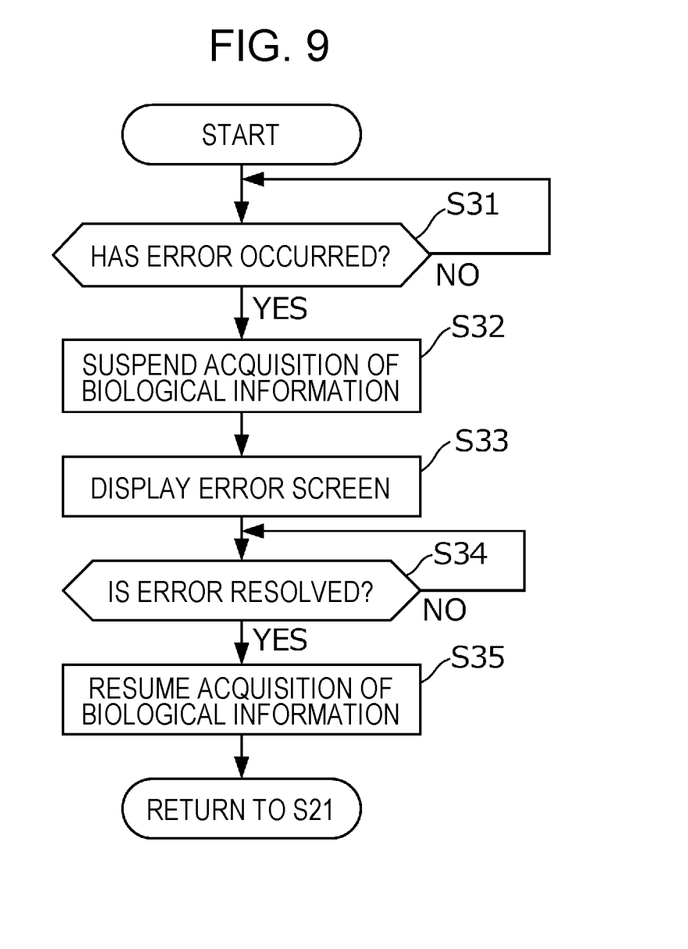
FIG. 9 is a flowchart illustrating another example of operation performed by the image processing apparatus 120.

FIG. 9 is a flowchart illustrating another example of operation performed by the image processing apparatus 120. This operation is performed after the process is started in step S21 illustrated in FIG. 5. The example illustrated in FIG. 9 indicates an example of operation for a case where an error has occurred after the copy process is started.

In step S31, the processor 121 determines whether or not an error has occurred. This error is an example of the event that hinders the process according to the present disclosure. The event that hinders the process is an event that makes continuation of the process difficult. Specific examples of such an event include a paper jam, paper out, and toner out. In the case where an error has not occurred, the determination in step S31 is NO, and the determination in step S31 is repeatedly performed. On the other hand, in the case where a paper jam error has occurred after the copy process is started, for example, the determination in step S31 is YES. In this case, the copy process is suspended, and the process proceeds to step S32.

In step S32, the processor 121 stops acquisition of biological information from the wearable terminal 110. When acquisition of biological information is suspended, it is not determined whether or not the user is feeling stressed using biological information. As a result, support information is not displayed even if the user feels stressed by the occurrence of the error. That is, display of support information is canceled. Control may be performed so as to cancel display of support information although acquisition of biological information is continued even if an error occurs.

Figure 10:
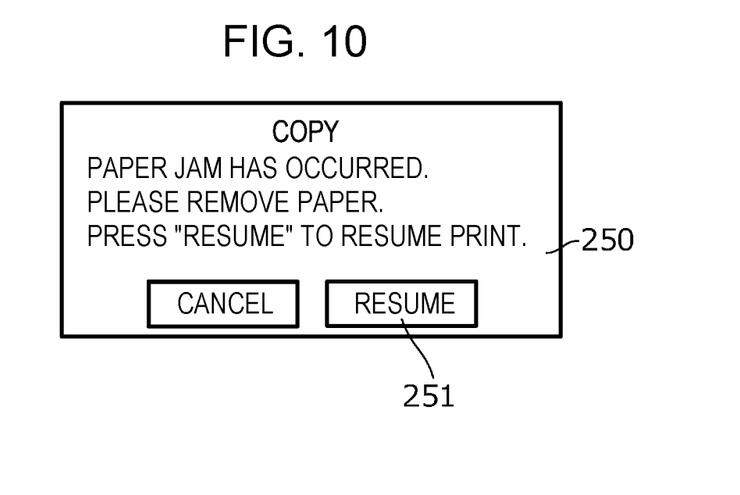
FIG. 10 illustrates an example of an error screen 250.

In step S33, the processor 121 displays, on the display section 125, an error screen 250 that reports the occurrence of the error. FIG. 10 illustrates an example of the error screen 250. The error screen 250 includes a message reporting that an error has occurred and a method of resolving the error, for example. The user may resolve the error by seeing the error screen 250. In the case where an error has occurred, the process is not continued unless the error is resolved, and therefore it is considered to be more convenient to the user to report the error than to support an operation. Therefore, the error screen 250 is displayed, rather than support information, in the case where an error has occurred.

In step S34, the processor 121 determines whether or not the error has been resolved. As illustrated in FIG. 10, for example, the error screen 250 includes a resume button 251 that is used to perform an operation to resume the process after the error is resolved. It may be determined that the error has been resolved when the user performs an operation to press the resume button 251 using the operation section 124. In the case where the error is not resolved, the determination in step S34 is NO, and the process in step S34 is repeatedly performed. In the case where the error is resolved, on the other hand, the determination in step S34 is YES, and the process proceeds to step S35.

In step S35, the processor 121 resumes acquisition of biological information from the wearable terminal 110. After step S35, the process returns to step S21 indicated in FIG. 5 to be resumed.

3. Modifications

The exemplary embodiment discussed above is an example of the present disclosure. The present disclosure is not limited to the exemplary embodiment discussed above. The exemplary embodiment discussed above may be modified as in the following examples to be implemented. Two or more of the following modifications may be combined with each other.

In the exemplary embodiment discussed above, the support information may be an animation related to an operation. The animation may be a tutorial movie that sequentially illustrates a sequence of operation procedures, for example. For example, an animation that illustrates the procedures for an operation to perform setting for the copy process may sequentially indicate operation buttons to be depressed in this operation. In addition, playback of the animation may be started at an operation that should be performed next to the operation that the user has already executed. In this case, the memory 122 stores a history of operations by the user. For example, a case where the operation to perform setting for the copy process includes first to fourth procedures and it is determined that the user is feeling stressed after operations according to the first and second procedures are performed and before an operation according to the third procedure is performed is assumed. In this case, playback of the animation may be started at the point at which illustration of the third procedure is started, since the operation that should be performed by the user next is the operation according to the third procedure. That is, a portion of the animation that illustrates the first and second procedures may not be displayed.

In the exemplary embodiment discussed above, the processor 121 of the image processing apparatus 120 may transmit support information to the user terminal 130 which is associated with the user. For example, the user ID of the user is correlated in advance with a terminal ID of the user terminal 130 of the user. A terminal ID correlated with the user ID which is input in step S11 is specified. Support information is transmitted to the user terminal 130 corresponding to the terminal ID. At this time, the support information is transmitted, as it is, without being encoded. When the communication section 133 receives the support information from the image processing apparatus 120, the processor 131 of the user terminal 130 displays the support information on the display section 135.

In the exemplary embodiment discussed above, the processor 121 of the image processing apparatus 120 may display support information, as it is, without being encoded on the display section 125. In addition, the processor 121 may switch the output destination of the support information between the display section 125 of the image processing apparatus 120 and the user terminal 130, depending on the data amount of the support information or the performance of the image processing apparatus 120. The support information may not be displayed on the display section 125, depending on the data amount of the support information or the performance of the image processing apparatus 120. In such a case, the user is allowed to recognize the support information by displaying the support information on the user terminal 130. For example, the processor 121 determines whether or not it is possible to display the support information on the display section 125. For example, it may be determined that it is not possible to display the support information on the display section 125 in the case where the data amount of the support information is equal to or more than a threshold value. Meanwhile, it may be determined that it is not possible to display the support information on the display section 125 in the case where a value that indicates the performance of the image processing apparatus 120 is equal to or less than a threshold value. The value that indicates the performance may be the screen size of the display section 125 or the processing speed of the processor 121, for example. In the case where it is determined that it is possible to display the support information on the display section 125, the processor 121 may display the support information on the display section 125. In the case where it is determined that it is not possible to display the support information on the display section 125, on the other hand, the processor 121 may transmit the support information to the user terminal 130 which is associated with the user.

In the exemplary embodiment discussed above, the processor 121 of the image processing apparatus 120 may transmit support information to a manager in order to allow the manager to support the user when the user does not know how to perform an operation related to a process. The transmission to the manager may be performed in addition to displaying the support information on the display section 125 or 135, or may be performed instead of displaying the support information on the display section 125 or 135. In the case where it is determined that the user is feeling stressed while performing an operation related to a process, for example, the processor 121 displays, on the display section 125, a message that asks whether or not the user needs support by the manager. When the user performs an operation to indicate that he/she needs support by the manager using the operation section 124 in response to the message, the processor 121 transmits support information to a management terminal (not illustrated) that is used by the manager and determined in advance. The management terminal is configured similarly to the user terminal 130 discussed above. However, the management terminal may not include the imaging section 136. At this time, information that is necessary for the manager to support the user, such as the user ID of the user which is input in step S11, screen data that indicate the screen displayed on the display section 125 when it is determined that the user is feeling stressed, and the history of operations by the user, is transmitted to the management terminal as the support information. When such information is transmitted from the image processing apparatus 120, the management terminal receives and displays the information. The manager is allowed to recognize the operation about which the user is feeling stressed by seeing information displayed on the management terminal, and therefore allowed to tell the user how to perform the operation. Such support by the manager may be provided online, or may be provided by the manager moving to the user and speaking directly with the user, for example.

In the exemplary embodiment discussed above, support information may be displayed in the case where it is determined that the user is feeling stressed while a process, the frequency of use of which by the user is equal to or less than a threshold value, is performed. That is, support information may not be displayed in the case where it is determined that the user is feeling stressed while a process, the frequency of use of which by the user is more than the threshold value, is performed. Support information is output for only processes, the frequency of use of which is low, because it is considered that the user is accustomed to perform an operation for processes, the frequency of use of which by the user is high, and that there is a possibility that the user does not need support for the latter processes. For example, the number of times of use of each app is counted for each user, and the frequency of use during a unit period is calculated on the basis of the counted number of times of use. Apps, the frequency of use of which is equal to or less than a threshold value, are set as specific apps. On the other hand, apps, the frequency of use of which is more than the threshold value, are set as excluded apps. In this case, processes executed by the excluded apps include a process, the frequency of use of which is more than the threshold value. In this modification, support information is output for processes, the frequency of use of which by the user is low. That is, support information is not output for processes, the frequency of use of which by the user is high. In a different example, the specific apps may be changed in accordance with an operation by the user or the manager.

In the exemplary embodiment discussed above, in the case where the user is not authenticated by the image processing apparatus 120, the processor 121 may detect the wearable terminal 110 that is the closest to the image processing apparatus 120 at the timing when the user uses the image processing apparatus 120, and pair the image processing apparatus 120 with the detected wearable terminal 110. This timing may be the time when the image processing apparatus 120 returns from a power-saving mode in the case where the image processing apparatus 120 has a power-saving mode, or may be the time when the image processing apparatus 120 is started, for example. In this case, in addition, the processor 121 may unpair the image processing apparatus 120 from the wearable terminal 110 at the timing when the user does not use the image processing apparatus 120 any more. This timing may be the time when the image processing apparatus 120 transitions to a power-saving mode in the case where the image processing apparatus 120 has a power-saving mode, for example.

In the exemplary embodiment discussed above, acquisition of biological information may not necessarily be started when a specific app is started. For example, acquisition of biological information may be started when the image processing apparatus 120 and the wearable terminal 110 are paired with each other.

In the exemplary embodiment discussed above, an error may occur while an operation related to a process is performed. For example, an error related to setting values for the copy process may occur while an operation to set such setting values is performed. Also in this case, as in the exemplary embodiment discussed above, output of support information is suspended until the error is resolved. In the exemplary embodiment discussed above, in addition, the cause of the suspension of output of support information is not limited to the occurrence of an error. For example, output of support information may be suspended also while a process is performed in accordance with an operation by the user. For example, in the case where a process of changing setting in accordance with an operation by the user to instruct a change in setting for communication is performed, an image indicating that the process is executed is occasionally displayed on the display section 125 if the process takes time. This indicates that a response to the operation by the user from the image processing apparatus 120 is waited for. Output of support information may be suspended, or acquisition of biological information may be stopped, while such an image is displayed.

In the exemplary embodiment discussed above, acquisition of biological information may not be stopped in the case where an error has occurred. In this case, a higher degree of priority is given in advance to an error screen than support information. In the case where it is determined that the user is feeling stressed when an error has occurred, an error screen is displayed on the display section 125 in priority to support information. When an error screen is displayed in priority, an error screen is displayed in a more striking manner than display of support information, and may be displayed in a striking color or displayed over display of support information.

In the exemplary embodiment discussed above, the psychological state of the user to be determined using biological information is not limited to a stressed state. The psychological state to be determined may be any psychological state that needs support for an operation, such as an anxious state, a perplexed state, a tensed state, and an irritated state. In addition, the biological information is not limited to a heart rate or a blood pressure, and may be any biological information that indicates the psychological state of the user.

In the exemplary embodiment discussed above, the image processing apparatus 120 is an example of the information processing apparatus according to the present disclosure. However, the information processing apparatus according to the present disclosure is not limited to the image processing apparatus 120. For example, the information processing apparatus according to the present disclosure may include any information processing apparatus such as a home electric appliance, an audio device, and a computer.

In the embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

In the exemplary embodiment discussed above, the subjects of the processes performed by the image processing apparatus 100 are not limited to those in the example illustrated in FIGS. 4, 5, and 9. For example, at least some of the processes performed by the image processing apparatus 120 may be performed by a different device.

The present disclosure may be provided as a program to be executed by each of the image processing apparatus 120 and the wearable terminal 110. The image processing apparatus 120 and the wearable terminal 110 are each an example of the computer according to the present disclosure. The program may be downloaded via a communication line such as the Internet, and may be provided as recorded in a computer-readable recording medium such as a magnetic recording medium (such as a magnetic tape and a magnetic disk), an optical recording medium (such as an optical disc), a magneto-optical recording medium, and a semiconductor memory.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor,
   wherein the processor is configured to
      acquire biological information on a user, and
      output information that supports a process while an operation related to the process is performed by the user, the information being output in response to a psychological state of the user indicated by the biological information being brought to a state determined in advance.

2. The information processing apparatus according to claim 1,
   wherein the processor is configured to output different information in accordance with a screen on which the operation is performed.

3. The information processing apparatus according to claim 1,
   wherein the processor is configured to cause a display to display an image that is used to display the information on a terminal apparatus.

4. The information processing apparatus according to claim 2,
   wherein the processor is configured to cause a display to display an image that is used to display the information on a terminal apparatus.

5. The information processing apparatus according to claim 1,
   wherein the information is an animation, playback of which is started at an operation that should be performed next to an operation that the user has already executed.

6. The information processing apparatus according to claim 1,
   wherein the processor is configured to transmit the information to a terminal apparatus associated with the user.

7. The information processing apparatus according to claim 2,
   wherein the processor is configured to transmit the information to a terminal apparatus associated with the user.

8. The information processing apparatus according to claim 3,
   wherein the processor is configured to transmit the information to a terminal apparatus associated with the user.

9. The information processing apparatus according to claim 4,
   wherein the processor is configured to transmit the information to a terminal apparatus associated with the user.

10. The information processing apparatus according to claim 5,
    wherein the processor is configured to transmit the information to a terminal apparatus associated with the user.

11. The information processing apparatus according to claim 6,
    wherein the processor is configured to switch an output destination of the information between the information processing apparatus and the terminal apparatus, depending on a data amount of the information and a performance of the information processing apparatus.

12. The information processing apparatus according to claim 7,
    wherein the processor is configured to switch an output destination of the information between the information processing apparatus and the terminal apparatus, depending on a data amount of the information and a performance of the information processing apparatus.

13. The information processing apparatus according to claim 8,
    wherein the processor is configured to switch an output destination of the information between the information processing apparatus and the terminal apparatus, depending on a data amount of the information and a performance of the information processing apparatus.

14. The information processing apparatus according to claim 9,
    wherein the processor is configured to switch an output destination of the information between the information processing apparatus and the terminal apparatus, depending on a data amount of the information and a performance of the information processing apparatus.

15. The information processing apparatus according to claim 10,
    wherein the processor is configured to switch an output destination of the information between the information processing apparatus and the terminal apparatus, depending on a data amount of the information and a performance of the information processing apparatus.

16. The information processing apparatus according to claim 1,
    wherein the processor is configured to transmit the information to a manager of the information processing apparatus.

17. The information processing apparatus according to claim 1,
    wherein the processor is configured to suspend output of the information, in a case where an event occurs that hinders the process while the operation related to the process is performed, until the event is resolved.

18. The information processing apparatus according to claim 1,
    wherein the processor is configured to not output the information while an operation related to a first process is performed, the first process being one of a plurality of processes that meets a specific condition.

19. The information processing apparatus according to claim 18,
    wherein the first process is a process, a frequency of use of which by the user is more than a threshold value.

20. A non-transitory computer readable medium storing a program causing a computer to execute a process comprising:

acquiring biological information on a user, and
outputting information that supports a process while an
operation related to the process is performed by the
user, the information being output in response to a
psychological state of the user indicated by the biological information being brought to a state determined
in advance.

* * * * *